(12) United States Patent
Chen et al.

(10) Patent No.: US 12,257,725 B2
(45) Date of Patent: Mar. 25, 2025

(54) JUMPING MOTION CONTROL METHOD FOR BIPED ROBOT, BIPED ROBOT AND COMPUTER-READABLE STORAGE MEDIUM

(71) Applicant: UBTECH ROBOTICS CORP LTD, Shenzhen (CN)

(72) Inventors: Chunyu Chen, Shenzhen (CN); Ligang Ge, Shenzhen (CN); Yizhang Liu, Shenzhen (CN); Jiangchen Zhou, Shenzhen (CN); Qiuyue Luo, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 273 days.

(21) Appl. No.: 17/976,904

(22) Filed: Oct. 31, 2022

(65) Prior Publication Data
US 2023/0182307 A1    Jun. 15, 2023

(30) Foreign Application Priority Data
Dec. 14, 2021    (CN) .......................... 202111528491.3

(51) Int. Cl.
*B25J 9/16* (2006.01)
*B25J 13/08* (2006.01)
*B62D 57/032* (2006.01)

(52) U.S. Cl.
CPC .......... *B25J 9/1692* (2013.01); *B25J 9/1664* (2013.01); *B25J 13/089* (2013.01); *B62D 57/032* (2013.01)

(58) Field of Classification Search
CPC ...... B25J 13/089; B25J 9/1664; B25J 9/1692; B25J 13/08; B25J 9/1602; B62D 57/032;
(Continued)

(56) References Cited

U.S. PATENT DOCUMENTS

| | | | |
|---|---|---|---|
| 2005/0038560 A1* | 2/2005 | Nagasaka ............ | B62D 57/032 700/245 |
| 2006/0106495 A1* | 5/2006 | Takenaka ............. | B62D 57/032 700/253 |

(Continued)

FOREIGN PATENT DOCUMENTS

| | | | | |
|---|---|---|---|---|
| JP | 2005177884 A | * | 7/2005 | ........... B62D 57/032 |

OTHER PUBLICATIONS

Translation of JP 2005177884 A (Year: 2005).*
(Continued)

*Primary Examiner* — Adam R Mott
*Assistant Examiner* — James Miller Watts, III (57) ABSTRACT

A jumping motion control method for a biped robot includes: before feet of the biped robot leaves a support surface, estimating a motion trajectory of the biped robot that leaves the support surface according to a period of time when the biped robot stays or flips in the air; calculating a first motion angle of each joint of legs of the biped robot according to the motion trajectory and inverse kinematics; determining a constraint condition according to a motion type to which an action to be performed by the biped robot corresponds; optimizing the first motion angles according to the constraint condition to obtain a second motion angle of each joint of legs of the biped robot; and controlling a jumping motion of the biped robot according to the second motion angles.

20 Claims, 4 Drawing Sheets

(58) Field of Classification Search
CPC .... B62D 57/022; B62D 57/028; B62D 57/02; G05B 2219/40264; G05D 1/0212; G05D 1/0246
USPC ......................................................... 700/254
See application file for complete search history.

(56) References Cited

U.S. PATENT DOCUMENTS

| | | | |
|---|---|---|---|
| 2007/0016329 A1* | 1/2007 | Herr .......................... | A61F 2/70 700/250 |
| 2010/0017028 A1* | 1/2010 | Suga .................... | B62D 57/032 901/1 |
| 2013/0218345 A1* | 8/2013 | Lee .......................... | B25J 9/162 700/261 |
| 2022/0410378 A1* | 12/2022 | Deits ........................ | B25J 13/08 |

OTHER PUBLICATIONS

M. Chignoli, D. Kim, E. Stanger-Jones and S. Kim, "The MIT Humanoid Robot: Design, Motion Planning, and Control for Acrobatic Behaviors," 2020 IEEE-RAS 20th International Conference on Humanoid Robots (Humanoids), Munich, Germany, 2021, pp. 1-8, doi: 10.1109/HUMANOIDS47582.2021.9555782. (Year: 2021).*

Henderson, Tom. Kinematic Equations and Freefall. Kinematic Equations and Free Fall, physicsclassroom.com, Jun. 1, 2018, web.archive.org/web/20180601033213/https://www.physicsclassroom.com/class/1DKin/Lesson-6/Kinematic-Equations-and-Free-Fall#expand. (Year: 2018).*

V. Nunez and N. Nadjar-Gauthier, "Control strategy for vertical jump of humanoid robots," 2005 IEEE/RSJ International Conference on Intelligent Robots and Systems, Edmonton, AB, Canada, 2005, pp. 2253-2258, doi: 10.1109/IROS.2005.1545059. (Year: 2005).*

M. T. Pope, S. Christensen, D. Christensen, A. Simeonov, G. Imahara and G. Niemeyer, "Stickman: Towards a Human Scale Acrobatic Robot," 2018 IEEE International Conference on Robotics and Automation (ICRA), Brisbane, QLD, Australia, 2018, pp. 2134-2140, doi: 10.1109/ICRA.2018.8462836. (Year: 2018).*

S. Sakka and K. Yokoi, "Humanoid Vertical Jumping based on Force Feedback and Inertial Forces Optimization," Proceedings of the 2005 IEEE International Conference on Robotics and Automation, Barcelona, Spain, 2005, pp. 3752-3757, doi: 10.1109/ROBOT.2005.1570692. (Year: 2005).*

J. Shen, Y. Liu, X. Zhang and D. Hong, "Optimized Jumping of an Articulated Robotic Leg," 2020 17th International Conference on Ubiquitous Robots (UR), Kyoto, Japan, 2020, pp. 205-212, doi: 10.1109/UR49135.2020.9144799. (Year: 2020).*

Gunwoo Park, Jong Hyeon Park, Backflips Performed by Humanoid Robots Based on Extended Linear Inverted Pendulum Mode, IFAC Proceedings Volumes vol. 45, Issue 22, 2012, pp. 505-510, ISSN 1474-6670, (Year: 2012).*

K. Arikawa and T. Mita, "Design of multi-DOF jumping robot," Proceedings 2002 IEEE International Conference on Robotics and Automation (Cat. No. 02CH37292), Washington, DC, USA, 2002, pp. 3992-3997 vol. 4, doi: 10.1109/ROBOT.2002.1014358. (Year: 2002).*

X. Xiong and A. D. Ames, "Sequential Motion Planning for Bipedal Somersault via Flywheel SLIP and Momentum Transmission with Task Space Control," 2020 IEEE/RSJ International Conference on Intelligent Robots and Systems (IROS), Las Vegas, NV, USA, 2020, pp. 3510-3517, (Year: 2020).*

M. Chignoli and S. Kim, "Online Trajectory Optimization for Dynamic Aerial Motions of a Quadruped Robot," 2021 IEEE International Conference on Robotics and Automation (ICRA), Xi'an, China, 2021, pp. 7693-7699 (Year: 2021).*

* cited by examiner

JUMPING MOTION CONTROL METHOD FOR BIPED ROBOT, BIPED ROBOT AND COMPUTER-READABLE STORAGE MEDIUM

CROSS REFERENCE TO RELATED APPLICATIONS

This application claims priority to Chinese Patent Application No. CN 202111528491.3, filed Dec. 14, 2021, which is hereby incorporated by reference herein as if set forth in its entirety.

BACKGROUND

1. Technical Field

The present disclosure generally relates to robots, and particularly to a jumping motion control method, a biped robot, and a computer-readable storage medium.

2. Description of Related Art

With the continuous advancement of technology, biped robots can imitate more and more actions performed by humans. For example, they can walk and stretch their arms by controlling the rotation of "hand joints" and "foot joints". In addition, some bipedal robots can also realize the jumping motion by using an offline planning approach. However, when using the offline planning approach to plan the input parameters, there may be a problem that the input parameters exceed the allowable operating range of actuating components (e.g., servos, joints, etc.) of the robot, which requires manual debugging to realize the jumping motion.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 1:
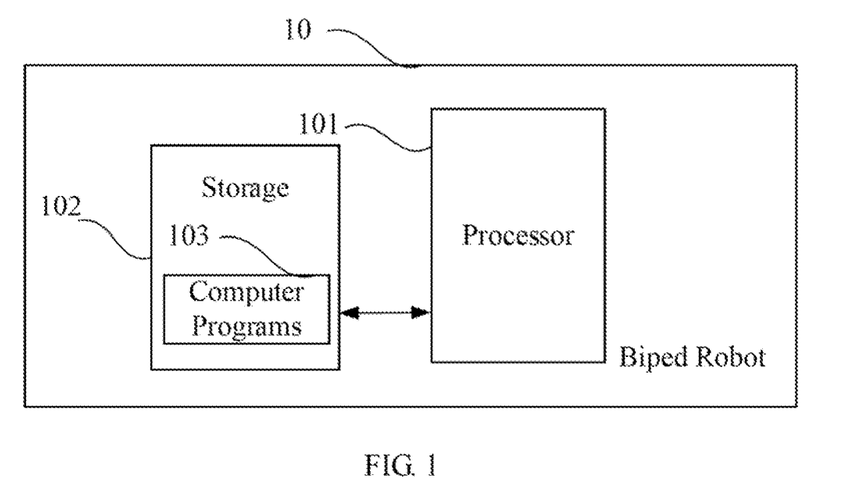
FIG. 1 is a schematic block diagram of a biped robot according to one embodiment.
Figure 2:
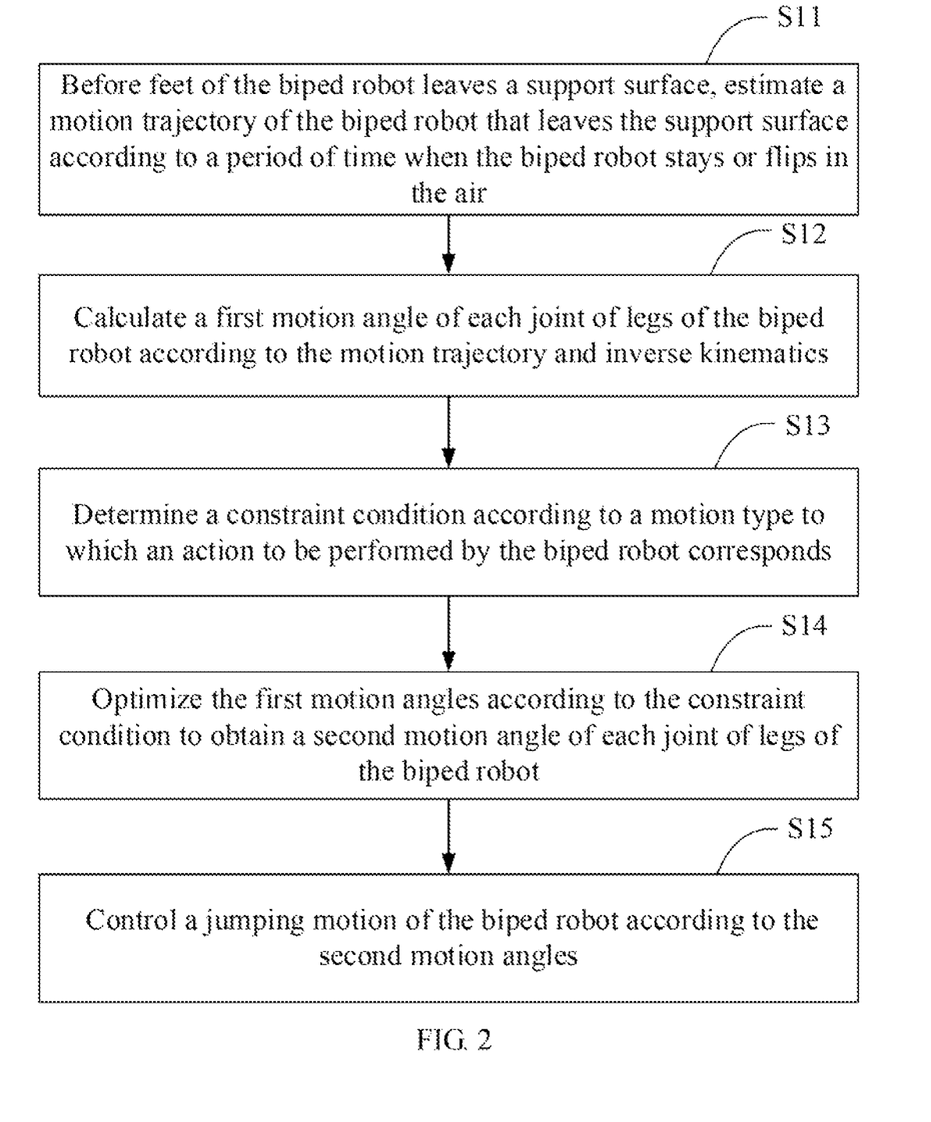
FIG. 2 is an exemplary flowchart of a method for controlling the biped robot according to one embodiment.

FIG. 1 shows a schematic block diagram of a biped robot 10 according to one embodiment. The biped robot 10 may include a processor 101, a storage 102, and one or more executable computer programs 103 that are stored in the storage 102. The storage 102 and the processor 101 are directly or indirectly electrically connected to each other to realize data transmission or interaction. For example, the storage 102 and the processor 101 can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the biped robot 10, such as steps S11 to S15 in FIG. 2 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random access memory (RAM), a read only memory (ROM), a programmable read only memory (PROM), an erasable programmable read-only memory (EPROM), and an electrical erasable programmable read-only memory (EEPROM). The storage 102 may be an internal storage unit of the biped robot 10, such as a hard disk or a memory. The storage 102 may also be an external storage device of the biped robot 10, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the biped robot 10. The storage 102 can also be used to temporarily store data that have been output or is about to be output.

Figure 4:
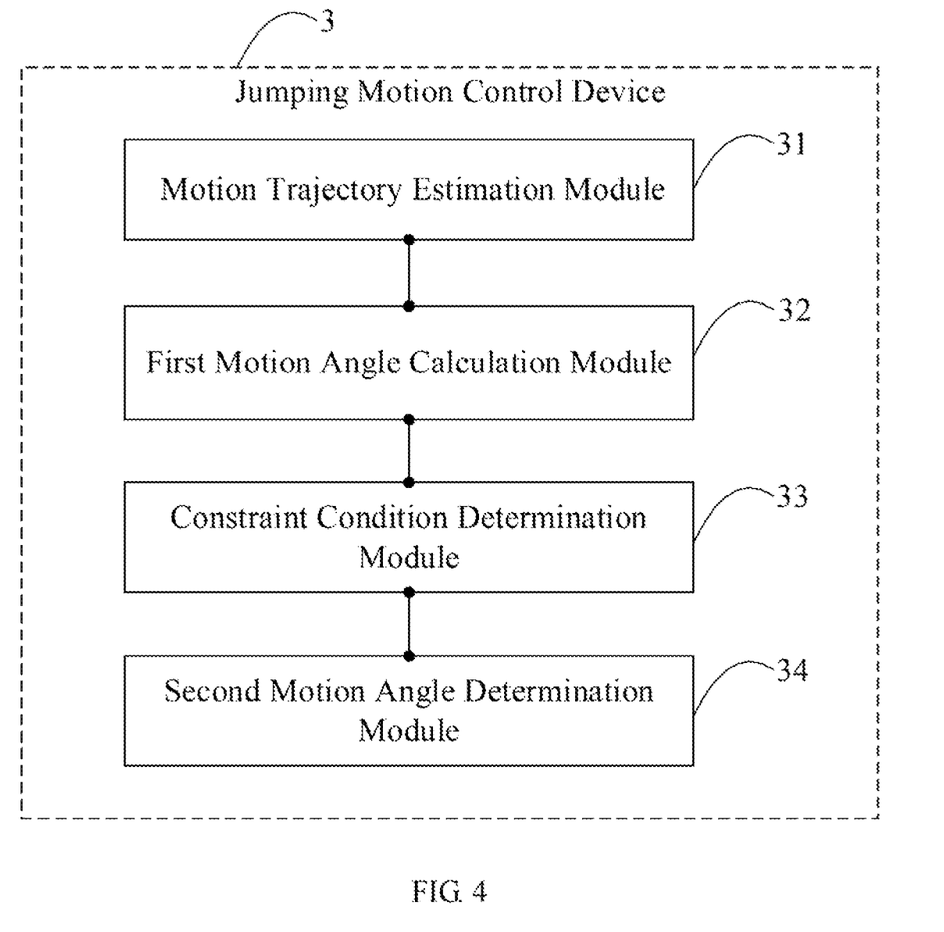
FIG. 4 is a schematic block diagram of a jumping motion control device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the biped robot 10. For example, the one or more computer programs 103 may be divided into a motion trajectory estimation module 31, a first motion angle calculation module 32, a constraint condition determination module 33 and a second motion angle determination module 34 as shown in FIG. 4.

It should be noted that the block diagram shown in FIG. 1 is only an example of the biped robot 10. The biped robot 10 may include more or fewer components than what is shown in FIG. 1, or have a different configuration than what is shown in FIG. 1. Each component shown in FIG. 1 may be implemented in hardware, software, or a combination thereof.

When the conventional offline planning method is employed to determine the motion angle of each joint of the biped robot, some of the motion angles obtained by the planning may exceed the allowable operating range of the corresponding joints, which leads to the problem of control errors when the biped robot is controlled according to the motion angles exceeding the allowable operating range of the joints.

In order to ensure that the motion angles input to the server meets the requirements, a jumping motion control method for a biped robot is provided. According to this method, the motion trajectory of the biped robot after leaving the support surface (i.e., ground) is estimated first, and then the first motion angle of each joint of the legs of the biped robot is calculated according to the motion trajectory and inverse kinematics. Finally, the first motion angles are optimized in combination with the determined constraint condition to obtain the second motion angles. The constraint condition is determined according to the motion type to which the action to be performed by the biped robot corresponds, that is, the constraint condition matches the motion to be performed by the biped robot. Therefore, after the first motion angles are optimized according to the constraint condition, motion angles that are more in line with the motion to be performed by the biped robot can be obtained.

FIG. 2 shows an exemplary flowchart of a method for controlling the biped robot 10 according to one embodiment. The method may include steps S11 to S15.

Step S11: Before feet of the biped robot leaves a support surface, estimate a motion trajectory of the biped robot that leaves the support surface according to a period of time when the biped robot stays or flips in the air.

In one embodiment, before the biped robot performs a jumping action (e.g., a backflip), that is, before the biped robot leaves the support surface, the biped robot will estimate the trajectory of the biped robot that leaves the support surface based on the period of time it stays or flips in the air.

Step S12: Calculate a first motion angle of each joint of legs of the biped robot according to the motion trajectory and inverse kinematics.

In one embodiment, a centroid coordinate system of the biped robot is determined according to the motion trajectory of the biped robot, and the centroid coordinate system is substituted into the inverse kinematics for the robot to calculate the first motion angles.

Figure 3:
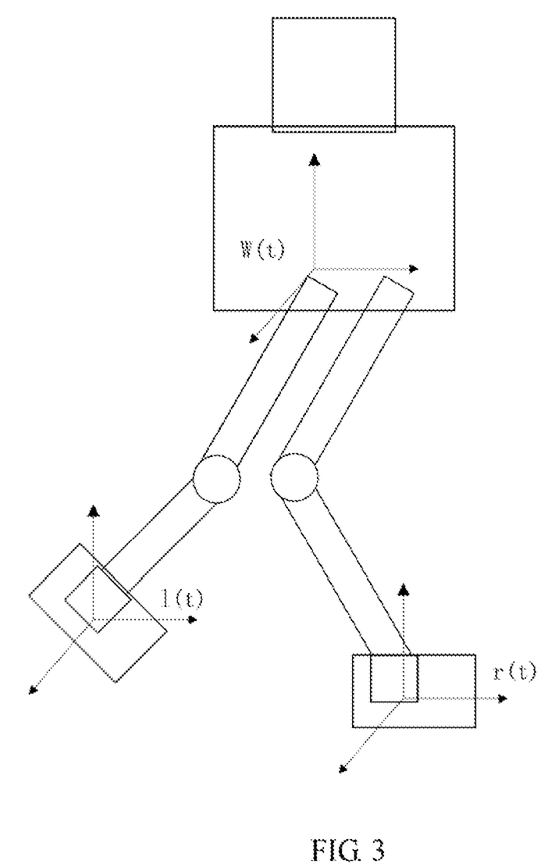
FIG. 3 is a schematic diagram of the biped robot according to one embodiment.

As shown in FIG. 3, for the jumping motion of the biped robot, a single mass model is used to calculate the motion trajectory of the biped robot. Assume that the centroid coordinate systems of the biped robot in the three reference coordinate systems shown in FIG. 3 are: $w(t)=[x_{w0}\ y_{w0}\ z(t)\ \alpha_{w0}\ \beta(t)\ \gamma_{w0}]^T$, $r(t)=[x_{r0}\ y_{r0}\ z_{r0}\ \alpha_{r0}\ \beta_{r0}\ \gamma_{r0}]^T$, and $l(t)=[x_{l0}\ y_{l0}\ z_{l0}\ \alpha_{l0}\ \beta_{l0}\ \gamma_{l0}]^T$. The first motion angles can be obtained by substituting the three coordinate systems into the inverse kinematics for the robot. In each of the above-mentioned centroid coordinate systems, the first three parameters represent position information, the last three parameters represent the corresponding steering angles around three axes, and t represents time. When t takes multiple consecutive moments, $z(t)$ and $\beta(t)$ in the above-mentioned centroid coordinate systems respectively represent the motion trajectory of the biped robot that leaves the support surface in the vertical direction and the motion trajectory in the rotation direction.

It should be noted that the first motion angles are vector, and each element included in the vector is an angle of a joint, such as the angles of a joint of an ankle. In one embodiment, the first motion angles are 12-dimensional vector.

Step S13: Determine a constraint condition according to a motion type to which an action to be performed by the biped robot corresponds.

In one embodiment, the biped robot performs a corresponding action according to a received control command.

For example, when a user wants the biped robot to perform a back flip, the control command will carry parameters related to the back flip, such as the acceleration in the vertical direction and the angular acceleration of the biped robot. When the user wants the biped robot to run, the control command will carry parameters related to the running action, such as the acceleration of the biped robot in the horizontal direction. That is, when the motion type of the action to be performed by the biped robot is different (for example, whether it is a backflip or a jump that does not involve flipping, etc.), the joints to be controlled and the parameters corresponding to each joint are different. That is, determining the corresponding constraint conditions according to different motion types will make the determined constraint conditions more accurate.

Step S14: Optimize the first motion angles according to the constraint condition to obtain a second motion angle of each joint of legs of the biped robot.

In one embodiment, after the first motion angles are optimized according to the constraint condition, the optimized first motion angles are more matched with the motion type to which the action to be performed by the biped robot corresponds. That is, after the first motion angles are optimized according to the constraint condition, it can be ensured that the obtained second motion angles do not exceed the allowable operating range of the joints corresponding to the motion type to which the action to be performed corresponds.

Step S15: Control a jumping motion of the biped robot according to the second motion angles.

In one embodiment, the optimized first motion angles (i.e., the second motion angles) are input into the servos of the biped robot, so as to control the biped robot to perform a corresponding action according to the second motion angles. Since the second motion angles are optimized angles of the joints of the legs of the biped robot, the motion trajectory can be optimized by using the second motion angles to control the motion of the biped robot before the biped robot leaves the support surface.

According to the embodiment above, the first motion angles are calculated according to the motion trajectory and inverse kinematics. Here, the motion trajectory is the estimated motion trajectory of the biped robot after it leaves the support surface. Therefore, the first motion angles are the angles of the joints of the leg of the biped robot obtained by the biped robot based on the current motion parameters. Since the constraint condition is determined according to the motion type to which an action to be performed by the biped robot corresponds, that is, the constraint condition matches the motion to be performed by the biped robot, joint angles more in line with the motion to be performed by the biped robot can be obtained after the first motion angles are optimized according to the constraint condition. Therefore, it can be ensured that the obtained second motion angles do not exceed the allowable operating range of the joints of the biped robot corresponding to the motion to be performed by the biped robot.

In one embodiment, step S13 may include the following steps.

Step S131: Determine a corresponding kinetic equation according to the motion type to which the action to be performed by the biped robot corresponds.

Specifically, it is assumed that the motion type is a back flip, and the back flip involves vertical jump and rotational motion. For the vertical jump and the rotational motion, the kinetic equation can be established as follows: $m\ddot{W}=f+mg$; $h=A(\theta)\ddot{\theta}$; $\dot{h}=c\times f$, where $W=[x_{w0}\ y_{w0}\ z(t)]^T$ that represents the motion trajectory of the center of mass of the biped robot in the three axes, $[\ ]^T$ represents the transpose of a vector, t represents time, m represents the mass of the biped robot, g represents gravitational constant, $f=[f_x\ f_y\ f_z]^T$ represents the contact force between the robot and the support surface, h represents the angular momentum of the robot and can be a three-dimensional vector, $A(\theta)$ represents the momentum matrix, and c represents the vector from the center of mass to the contact point, which can be a three-dimensional vector. The momentum matrix is used to describe the relationship between the angular velocity and the momentum. In the momentum matrix, only the angular velocity changes, and the momentum matrix can be a 12×6-dimensional matrix. In the equation above, one dot over the parameter indicates a first-order derivative of the parameter, and two dots indicate a second-order derivative of the parameter. For example, $\ddot{W}$ represents the second-order derivative of W, and $\dot{\theta}$ represents the first-order derivative of $\theta$.

Step S132: Determine the constraint condition according to the kinetic equation.

In one embodiment, the determined kinetic equation can be used as the constraint condition. The actions of the biped robot are performed by simulating the actions of a human, and the actions of the human are in line with the kinetic equation. Therefore, in the steps S131 and S132, the kinetic equation is determined based on the motion type, and then the corresponding constraint condition is determined according to the kinetic equation, which can ensure that the constraint condition matches the motion type, thereby improving the accuracy of the determined constraint condition.

In one embodiment, the above-mentioned kinetic equation includes a first equation, and a parameter of the above-mentioned first equation is the contact force between the biped robot and the support surface. In one embodiment, the step S132 may include the following steps.

Step S1321: Determine a first sub-constraint condition according to the first equation.

In one embodiment, the first equation is used as the first sub-constraint condition.

Step S1322: According to the contact force between the biped robot and the support surface, determine a condition corresponding to the biped robot not sliding on the support surface before leaving the support surface, and determine the condition as a second sub-constraint condition.

Considering the actual situation of the ground friction, the biped robot will not slide on the support surface before leaving the support surface when the following conditions are met: $f_x \leq \mu f_z$; $f_y \leq \mu f_z$, where $\mu$ represents the friction coefficient between the biped robot and the support surface.

In one embodiment, considering that the biped robot may slip when it starts to jump, a condition corresponding to not slipping on the support surface is used as the second sub-constraint condition, which can avoid the biped robot from slipping when it starts to jump.

Step S1323: Determine the constraint condition according to the first sub-constraint condition and the second sub-constraint condition.

In one embodiment, the first sub-constraint condition and the second sub-constraint condition are used as the constraint condition.

In the steps S1321 to S1323, taking the condition corresponding to not slipping on the support surface as one of the constraint conditions, it can ensure that the biped robot will not slip on the support surface when it performs actions according to the second motion angles.

In one embodiment, step S14 may include the following steps.

Step S141: Determine an optimization function according to the first motion angles, the second motion angles, the motion trajectory of the biped robot that leaves the support surface, derivatives of the second motion angles, and a preset weight coefficient.

In one embodiment, the derivatives of the second motion angles include the first-order derivatives of the second motion angles, and may also include the second-order derivatives of the second motion angles. The first-order derivatives of the second motion angles represent the rate of change of the angles of the joints, and the second-order derivatives of the second motion angles represent the rate of change of the state of the biped robot.

Step S142: Determine the second motion angles using the optimization function according to the constraint condition.

In the steps S141 and S142, since the optimization function is determined according to the first motion angles, the second motion angles, the motion trajectory of the biped robot that leaves the support surface, the derivatives of the second motion angles, and the preset weight coefficient, the second motion angles optimized according to the optimization function can meet the requirements not only in joint angles of the joints, but also in the rate of change of the joint angles of the joints and/or the rate of change of the state.

In one embodiment, if the jumping height of the biped robot is preset, estimating the motion trajectory of the biped robot that leaves the support surface according to the period of time when the biped robot stays or flips in the air of step S11 may include the following steps S111 and S112.

Step S111: Determine the period of time when the biped robot stays in the air according to a jumping height of the biped robot.

In one embodiment, since the robot is affected by gravity when it jumps, the period of time when the biped robot stays in the air can be determined according to the following equation: $H=(½)gT^2$, where H represents the preset jumping height of the biped robot, g represents the gravitational constant, and T is the period of time when the biped robot stays in the air.

Step S112: According to the period of time when the biped robot stays in the air, calculate an angular velocity and a velocity in a vertical direction of the biped robot when the biped robot leaves the support surface to estimate the trajectory of the biped robot that leaves the support surface.

In on embodiment, the angular velocity $\omega$ of the biped robot can be calculated according to $T=2\pi/\omega$, where, in $\pi$ is a constant. Then, according to $v_1=gT/2$, the speed of the biped robot in the vertical direction when it jumps can be determined.

In one embodiment, according to the motion of the biped robot in the two directions of rotation and vertical movement, it is assumed that the acceleration of the biped robot is constant, the acceleration in the vertical direction is $a_0$, the angular acceleration is $\alpha_0$, the initial position in the vertical direction is $z_0$ and the angular initial position is $\beta_0$, the motion trajectories $z(t)$ and $\beta(t)$ of the biped robot in two directions can be calculated according to the following equations:

$$z(t)=v_1*t+(½)*(a_0-g)*t^2 \text{ and } \beta(t)=(½)*\alpha_0*t^2.$$

According to $z_0$ and $z(t)$, the complete motion trajectory of the biped robot in the vertical direction can be obtained, and according to $\beta_0$ and $\beta(t)$, the complete motion trajectory of the biped robot in the rotational direction can be obtained. The trajectory of the biped robot after it leaves the support surface is mainly related to the period of time when the biped robot stays in the air. Therefore, according to the period of time when the biped robot stays in the air, the initial position of the biped robot, the acceleration of the biped robot and the gravity to estimate the motion trajectory of the biped robot after it leaves the support surface, the accuracy of the obtained motion trajectory can be improved.

In one embodiment, if the angular velocity of the flipping of the biped robot is preset, estimating the motion trajectory of the biped robot that leaves the support surface according to the period of time when the biped robot stays or flips in the air of step S11 may include the following steps S113 and S114.

Step S113: If the motion type to which the action to be performed by the biped robot corresponds is flipping in the air, determine the period of time when the biped robot flips in the air according to an angular velocity corresponding to the flipping to be performed by the biped robot.

In one embodiment, when the motion type of the action to be performed by the biped robot is a backflip, the time required for the biped robot to complete the action of the backflip (i.e., the period of time when the biped robot stays in the air) can be calculated according to the following equation:

$$T = \frac{2\pi}{\omega},$$

where T is time time required for the biped robot to do a 360 degrees flip, $\omega$ is the rotational angular velocity of the biped robot, and $\pi$ is a constant.

Step S114: According to the period of time when the biped robot flips in the air, calculate a velocity in a vertical direction of the biped robot when the biped robot leaves the support surface to estimate the trajectory of the biped robot that leaves the support surface.

In one embodiment, after the period of time T when the biped robot flips in the air is determined, the speed in the vertical direction when the biped robot jumps can be determined according to $v_1 = gT/2$. Then, the motion trajectories $z(t)$ and $\beta(t)$ of the biped robot in the rotational and vertical directions can be calculated according to the following equations: $z(t) = v_1 * t + (\frac{1}{2}) * (a_0 - g) * t^2$ and $\beta(t) = (\frac{1}{2}) * \alpha_0 * t^2$.

The trajectory of the biped robot after it leaves the support surface is mainly related to the period of time when the biped robot stays in the air. Therefore, according to the period of time when the biped robot stays in the air, the initial position of the biped robot, the acceleration of the biped robot and the gravity to estimate the motion trajectory of the biped robot after it leaves the support surface, the accuracy of the obtained motion trajectory can be improved.

In one embodiment, it is assumed that the step length is $t_m$, the number of insertion points can be calculated according to the following equation:

$$N = \frac{T}{t_m},$$

where T is the estimated period of time when the biped robot stays in the air (or the period of time when the biped robot flips in the air). Optimization functions can be established as follows:

$$\min_{\theta(k), \dot{W}(k), \dot{\theta}(k),} \sum_{k=1}^{N} \left( \|\theta_r(k) - \theta(k)\|_{Q1} + \|\dot{\theta}(k)\|_{Q2} + \|\dot{W}(k)\|_{Q3} + \|\ddot{\theta}(k)\|_{Q4} \right) t_m;$$

s.t. $m\ddot{W}(k) = f(k) + mg;$ $h(k) = A(\theta(k))\dot{\theta}(k);$ $\dot{h}(k) = c(k) \times f(k);$ $W(k) = \text{kinematic}(\theta(k));$ $f_x \le \mu f_z, f_y \le \mu f_z;$ $\theta(k)_{min} \le \theta(k) \le \theta(k)_{max};$ where $\theta_r(k)$ represents the first motion angle, $\theta(k)$ represents the second motion angle, $\|\ \|$ represents the norm of a vector, Q1, Q2 and Q3 represent weight coefficients, $\theta(k)_{max}$ and $\theta(k)_{min}$ represent the upper and lower limits of the angle of a joint, s. t. represents a constraint condition, and kinematic( ) represents the positive kinematic equation of the robot. The sum of Q1, Q2 and Q3 is equal to 1. When a $\theta(k)$ with the smallest difference from $\theta_r(k)$ is needed, Q1 is required to be set to the maximum value. When the rate of change of angles of the joints is required to be the smallest, Q2 needs to be set to the maximum value. When the end acceleration is required to be the smallest, Q3 needs to be set to the maximum value. When the rate of change of state of the biped robot is required to be the smallest, Q4 needs to be set to the maximum value.

By constructing the above optimization indexes and calculating by using the optimization tool, the second motion angle $\theta(k)$, and robot states $W(k)$ and $\beta(k)$ can be obtained. The motion of the biped robot is controlled by sending the obtained $\theta(k)$ to the servos of the robot.

In one embodiment, the jumping motion control method may further include the following steps after step S15.

Step S16: Detect whether the jumping motion of the biped robot meets a requirement, and when it does not meet the requirement, adjust the preset weight coefficient to obtain a new optimization function in response to the jumping motion of the biped robot not meeting the requirement.

Since the biped robot performs jumping motion according to the obtained second motion angles, its bouncing motion may not meet the requirements. For example, the rate of change of angles of the joints does not meet the requirements, or the end acceleration does not meet the requirements, etc. In this case, the corresponding weight coefficients need to be adjusted to obtain a new optimization function.

Step S17: Determine new second motion angles using the new optimization function according to the constraint condition.

Step S18: Control a jumping motion of the biped robot according to the new second motion angles.

After the new optimization function is obtained, the second motion angles are re-determined according to the constraint condition. After that, the jumping motion of the biped robot will be controlled according to the new second motion angles. Steps S16 to S18 are repeated until the jumping motion controlled according to the newly determined second motion angles meets the requirements.

It should be understood that sequence numbers of the foregoing processes do not mean particular execution sequences. The execution sequences of the processes should be determined based on functions and internal logic of the processes, and should not be construed as any limitation on the implementation processes of this embodiment of this application.

FIG. 4 shows an exemplary block diagram of a jumping motion controlling device 3 according to one embodiment. The jumping motion control device 3 can be applied to a biped robot, and may include a motion trajectory estimation module 31, a first motion angle calculation module 32, a constraint condition determination module 33 and a second motion angle determination module 34.

The motion trajectory estimation module 31 is to: before feet of the biped robot leaves a support surface, estimate a motion trajectory of the biped robot that leaves the support surface according to a period of time when the biped robot stays or flips in the air.

The first motion angle calculation module 32 is to calculate a first motion angle of each joint of legs of the biped robot according to the motion trajectory and inverse kinematics.

The constraint condition determination module 33 is to determine a constraint condition according to a motion type to which an action to be performed by the biped robot corresponds.

The second motion angle determination module 34 is to optimize the first motion angles according to the constraint condition to obtain a second motion angle of each joint of legs of the biped robot.

According to the embodiment above, the first motion angles are calculated according to the motion trajectory and inverse kinematics. Here, the motion trajectory is the estimated motion trajectory of the biped robot after it leaves the support surface. Therefore, the first motion angles are the angles of the joints of the leg of the biped robot obtained by the biped robot based on the current motion parameters. Since the constraint condition is determined according to the motion type to which an action to be performed by the biped robot corresponds, that is, the constraint condition matches the motion to be performed by the biped robot, joint angles more in line with the motion to be performed by the biped robot can be obtained after the first motion angles are optimized according to the constraint condition. Therefore, it can be ensured that the obtained second motion angles do not exceed the allowable operating range of the joints of the biped robot corresponding to the motion to be performed by the biped robot.

In one embodiment, the constraint condition determination module 33 may include a kinetic equation determination unit and a constraint condition determination unit. The kinetic equation determination unit is to determine a corresponding kinetic equation according to the motion type to which the action to be performed by the biped robot corresponds. The constraint condition determination unit is to determine the constraint condition according to the kinetic equation.

In one embodiment, the kinetic equation includes a first equation, and one parameter of the first equation is a contact force between the biped robot and the support surface. The kinetic equation determination unit may include first sub-constraint determination unit, a second sub-constraint determination unit, and a constraint combination unit. The first sub-constraint determination unit is to determine a first sub-constraint condition according to the first equation. The second sub-constraint determination unit is to determine a condition corresponding to the biped robot not sliding on the support surface before leaving the support surface according to the contact force between the biped robot and the support surface, and determine the condition as a second sub-constraint condition. The constraint combination unit is to determine the constraint condition according to the first sub-constraint condition and the second sub-constraint condition.

In one embodiment, the second motion angle determination module 34 may include an optimization function determination unit and a second motion angle determination unit. The optimization function determination unit is to determine an optimization function according to the first motion angles, the second motion angles, the motion trajectory of the biped robot that leaves the support surface, derivatives of the second motion angles, and a preset weight coefficient. The second motion angle determination unit is to determining the second motion angles using the optimization function according to the constraint condition.

In one embodiment, if the jumping height of the biped robot is preset, the motion trajectory estimation module 31 may include a first time estimation unit and a first motion trajectory estimation unit. The first time estimation unit is to determine the period of time when the biped robot stays in the air according to a jumping height of the biped robot. The first motion trajectory estimation unit is to calculate an angular velocity and a velocity in a vertical direction of the biped robot according to the period of time when the biped robot stays in the air when the biped robot leaves the support surface to estimate the trajectory of the biped robot that leaves the support surface.

In one embodiment, if the angular velocity of the flipping of the biped robot is preset, the motion trajectory estimation module 31 may include a second time estimation unit and a second motion trajectory estimation unit. The second time estimation unit is to determine the period of time when the biped robot flips in the air according to an angular velocity corresponding to the flipping to be performed by the biped robot if the motion type to which the action to be performed by the biped robot corresponds is flipping in the air. The second motion trajectory estimation unit is to calculate a velocity in a vertical direction of the biped robot when the biped robot leaves the support surface according to the period of time when the biped robot flips in the air, to estimate the trajectory of the biped robot that leaves the support surface.

In one embodiment, the device 3 may further include a new optimization function determination module, a new second motion angle determination module, and motion control module. The new optimization function determination module is to detect whether the jumping motion of the biped robot meets a requirement, and when it does not meet the requirement, adjust the preset weight coefficient to obtain a new optimization function in response to the jumping motion of the biped robot not meeting the requirement. The new second motion angle determination module is to determine new second motion angles using the new optimization function according to the constraint condition. The motion control module is to control a jumping motion of the biped robot according to the new second motion angles.

In one embodiment, it is assumed that the step length is $t_m$, the number of insertion points can be calculated according to the following equation:

$$N = \frac{T}{t_m},$$

where T is the estimated period of time when the biped robot stays in the air (or the period of time when the biped robot flips in the air). Optimization functions can be established as follows:

$$\min_{\theta(k), \dot{W}(k), \dot{\theta}(k),} \sum_{k=1}^{N} \left( \|\theta_r(k) - \theta(k)\|_{Q1} + \|\dot{\theta}(k)\|_{Q2} + \|\dot{W}(k)\|_{Q3} + \|\ddot{\theta}(k)\|_{Q4} \right) t_m;$$

s.t. $m\ddot{W}(k) = f(k) + \mathrm{mg}$;

$h(k) = A(\theta(k))\dot{\theta}(k)$;

$\dot{h}(k) = c(k) \times f(k)$;

$W(k) = \mathrm{kinematic}(\theta(k))$;

$f_x \le \mu f_z, f_y \le \mu f_z$;

$\theta(k)_{min} \le \theta(k) \le \theta(k)_{max}$;

where $\theta_r(k)$ represents the first motion angle, $\theta(k)$ represents the second motion angle, $\| \|$ represents the norm of a vector, Q1, Q2 and Q3 represent weight coefficients, $\theta(k)_{max}$ and $\theta(k)_{min}$ represent the upper and lower limits of the angle of a joint, s. t. represents a constraint condition, and kinematic( ) represents the positive kinematic equation of the robot.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of this application. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

Another aspect of the present disclosure is directed to a computer program product. When the computer program product runs on the robot, it enables the robot to implement the steps in each of the foregoing method embodiments.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented jumping motion control method for a biped robot, comprising:
    before feet of the biped robot leaves a support surface, estimating a motion trajectory of the biped robot that leaves the support surface according to a period of time when the biped robot stays or flips in the air;
    calculating a first motion angle of each joint of legs of the biped robot according to the motion trajectory and inverse kinematics;
    determining a constraint condition according to a motion type to which an action to be performed by the biped robot corresponds;
    optimizing the first motion angles according to the constraint condition to obtain a second motion angle of each joint of legs of the biped robot; and
    controlling a jumping motion of the biped robot according to the second motion angles;
    wherein estimating the motion trajectory of the biped robot that leaves the support surface according to the period of time when the biped robot stays or flips in the air comprises:
        when the motion type to which the action to be performed by the biped robot corresponds is flipping in the air, determining the period of time when the biped robot flips in the air according to an angular velocity corresponding to the flipping to be performed by the biped robot; and
        according to the period of time when the biped robot flips in the air, calculating a velocity in a vertical direction of the biped robot when the biped robot leaves the support surface to estimate the trajectory of the biped robot that leaves the support surface.

2. The method of claim 1, wherein determining the constraint condition according to the motion type to which the action to be performed by the biped robot corresponds comprises:
    determining a corresponding kinetic equation according to the motion type to which the action to be performed by the biped robot corresponds; and
    determining the constraint condition according to the kinetic equation.

3. The method of claim 2, wherein the kinetic equation comprises a first equation, and one parameter of the first equation is a contact force between the biped robot and the support surface; determining the constraint condition according to the kinetic equation comprises:
    determining a first sub-constraint condition according to the first equation;
    according to the contact force between the biped robot and the support surface, determining a condition corresponding to the biped robot not sliding on the support surface before leaving the support surface, and determining the condition as a second sub-constraint condition; and determining the constraint condition according to the first sub-constraint condition and the second sub-constraint condition.

4. The method of claim 1, wherein optimizing the first motion angles according to the constraint condition to obtain the second motion angle of each joint of legs of the biped robot comprises:

determining an optimization function according to the first motion angles, the second motion angles, the motion trajectory of the biped robot that leaves the support surface, derivatives of the second motion angles, and a preset weight coefficient; and determining the second motion angles using the optimization function according to the constraint condition.

5. The method of claim 4, further comprising, after controlling a jumping motion of the biped robot according to the second motion angles, detecting whether the jumping motion of the biped robot meets a requirement, and when the jumping motion does not meet the requirement, adjusting the preset weight coefficient to obtain a new optimization function in response to the jumping motion of the biped robot not meeting the requirement;

determining new second motion angles using the new optimization function according to the constraint condition; and controlling a jumping motion of the biped robot according to the new second motion angles.

6. The method of claim 1, wherein estimating the motion trajectory of the biped robot that leaves the support surface according to the period of time when the biped robot stays or flips in the air comprises:

determining the period of time when the biped robot stays in the air according to a jumping height of the biped robot; and according to the period of time when the biped robot stays in the air, calculating an angular velocity and a velocity in a vertical direction of the biped robot when the biped robot leaves the support surface to estimate the trajectory of the biped robot that leaves the support surface.

7. A biped robot comprising:
one or more processors; and
a memory coupled to the one or more processors, the memory storing programs that, when executed, cause the one or more processors to:
before feet of the biped robot leaves a support surface, estimate a motion trajectory of the biped robot that leaves the support surface according to a period of time when the biped robot stays or flips in the air;
calculate a first motion angle of each joint of legs of the biped robot according to the motion trajectory and inverse kinematics;
determine a constraint condition according to a motion type to which an action to be performed by the biped robot corresponds;
optimize the first motion angles according to the constraint condition to obtain a second motion angle of each joint of legs of the biped robot; and
control a jumping motion of the biped robot according to the second motion angles;
wherein to estimate the motion trajectory of the biped robot that leaves the support surface according to the period of time when the biped robot stays or flips in the air, the programs, when executed, cause the one or more processors to:
when the motion type to which the action to be performed by the biped robot corresponds is flipping in the air, determine the period of time when the biped robot flips in the air according to an angular velocity corresponding to the flipping to be performed by the biped robot; and
according to the period of time when the biped robot flips in the air, calculate a velocity in a vertical direction of the biped robot when the biped robot leaves the support surface to estimate the trajectory of the biped robot that leaves the support surface.

8. The biped robot of claim 7, wherein to determine the constraint condition according to the motion type to which the action to be performed by the biped robot corresponds, the programs, when executed, cause the one or more processors to:

determine a corresponding kinetic equation according to the motion type to which the action to be performed by the biped robot corresponds; and determine the constraint condition according to the kinetic equation.

9. The biped robot of claim 8, wherein the kinetic equation comprises a first equation, and one parameter of the first equation is a contact force between the biped robot and the support surface; to determine the constraint condition according to the kinetic equation, the programs, when executed, cause the one or more processors to:

determine a first sub-constraint condition according to the first equation;

according to the contact force between the biped robot and the support surface, determine a condition corresponding to the biped robot not sliding on the support surface before leaving the support surface, and determining the condition as a second sub-constraint condition; and determine the constraint condition according to the first sub-constraint condition and the second sub-constraint condition.

10. The biped robot of claim 7, wherein to optimize the first motion angles according to the constraint condition to obtain the second motion angle of each joint of legs of the biped robot, the programs, when executed, cause the one or more processors to:

determine an optimization function according to the first motion angles, the second motion angles, the motion trajectory of the biped robot that leaves the support surface, derivatives of the second motion angles, and a preset weight coefficient; and determine the second motion angles using the optimization function according to the constraint condition.

11. The biped robot of claim 10, wherein the programs, when executed, cause the one or more processors to, after controlling a jumping motion of the biped robot according to the second motion angles, detect whether the jumping motion of the biped robot meets a requirement, and when the jumping motion does not meet the requirement, adjust the preset weight coefficient to obtain a new optimization function in response to the jumping motion of the biped robot not meeting the requirement;

determine new second motion angles using the new optimization function according to the constraint condition; and control a jumping motion of the biped robot according to the new second motion angles.

12. The biped robot of claim 7, wherein to estimate the motion trajectory of the biped robot that leaves the support surface according to the period of time when the biped robot stays or flips in the air, the programs, when executed, cause the one or more processors to:
determine the period of time when the biped robot stays in the air according to a jumping height of the biped robot; and
according to the period of time when the biped robot stays in the air, calculate an angular velocity and a velocity in a vertical direction of the biped robot when the biped robot leaves the support surface to estimate the trajectory of the biped robot that leaves the support surface.

13. A non-transitory computer-readable storage medium storing instructions that, when executed by at least one processor, cause the at least one processor to perform a jumping motion control method for a biped robot, the method comprising:
before feet of the biped robot leaves a support surface, estimating a motion trajectory of the biped robot that leaves the support surface according to a period of time when the biped robot stays or flips in the air;
calculating a first motion angle of each joint of legs of the biped robot according to the motion trajectory and inverse kinematics;
determining a constraint condition according to a motion type to which an action to be performed by the biped robot corresponds;
optimizing the first motion angles according to the constraint condition to obtain a second motion angle of each joint of legs of the biped robot; and
controlling a jumping motion of the biped robot according to the second motion angles;
wherein optimizing the first motion angles according to the constraint condition to obtain the second motion angle of each joint of legs of the biped robot comprises:
determining an optimization function according to the first motion angles, the second motion angles, the motion trajectory of the biped robot that leaves the support surface, derivatives of the second motion angles, and a preset weight coefficient; and
determining the second motion angles using the optimization function according to the constraint condition; and
wherein the method further comprises, after controlling a jumping motion of the biped robot according to the second motion angles,
detecting whether the jumping motion of the biped robot meets a requirement, and when the jumping motion does not meet the requirement, adjusting the preset weight coefficient to obtain a new optimization function in response to the jumping motion of the biped robot not meeting the requirement:
determining new second motion angles using the new optimization function according to the constraint condition; and
controlling a jumping motion of the biped robot according to the new second motion angles.

14. The non-transitory computer-readable storage medium of claim 13, wherein determining the constraint condition according to the motion type to which the action to be performed by the biped robot corresponds comprises:
determining a corresponding kinetic equation according to the motion type to which the action to be performed by the biped robot corresponds; and
determining the constraint condition according to the kinetic equation.

15. The non-transitory computer-readable storage medium of claim 14, wherein the kinetic equation comprises a first equation, and one parameter of the first equation is a contact force between the biped robot and the support surface; determining the constraint condition according to the kinetic equation comprises:
determining a first sub-constraint condition according to the first equation;
according to the contact force between the biped robot and the support surface, determining a condition corresponding to the biped robot not sliding on the support surface before leaving the support surface, and determining the condition as a second sub-constraint condition; and
determining the constraint condition according to the first sub-constraint condition and the second sub-constraint condition.

16. The non-transitory computer-readable storage medium of claim 14, wherein determining the constraint condition according to the kinetic equation comprises:
using the kinetic equation as the constraint condition.

17. The non-transitory computer-readable storage medium of claim 13, wherein estimating the motion trajectory of the biped robot that leaves the support surface according to the period of time when the biped robot stays or flips in the air comprises:
determining the period of time when the biped robot stays in the air according to a jumping height of the biped robot; and
according to the period of time when the biped robot stays in the air, calculating an angular velocity and a velocity in a vertical direction of the biped robot when the biped robot leaves the support surface to estimate the trajectory of the biped robot that leaves the support surface.

18. The non-transitory computer-readable storage medium of claim 13, wherein estimating the motion trajectory of the biped robot that leaves the support surface according to the period of time when the biped robot stays or flips in the air comprises:
when the motion type to which the action to be performed by the biped robot corresponds is flipping in the air, determining the period of time when the biped robot flips in the air according to an angular velocity corresponding to the flipping to be performed by the biped robot; and
according to the period of time when the biped robot flips in the air, calculating a velocity in a vertical direction of the biped robot when the biped robot leaves the support surface to estimate the trajectory of the biped robot that leaves the support surface.

19. The non-transitory computer-readable storage medium of claim 13, wherein calculating a first motion angle of each joint of legs of the biped robot according to the motion trajectory and inverse kinematics comprises:
determining a centroid coordinate system of the biped robot according to the motion trajectory of the biped robot, and calculating the first motion angle by substituting the centroid coordinate system into the inverse kinematics for the biped robot.

20. The non-transitory computer-readable storage medium of claim 19, wherein the motion trajectory of the biped robot is calculated by using a single mass model.

* * * * *